United States Patent [19]

Sidwell

[11] Patent Number: 5,927,518
[45] Date of Patent: Jul. 27, 1999

[54] RECYCLABLE MATERIAL HANDLING SYSTEM

[76] Inventor: David A. Sidwell, P.O. Box 513, North Liberty, Iowa 52317

[21] Appl. No.: 09/020,916

[22] Filed: Feb. 9, 1998

[51] Int. Cl.$^6$ .................................................... A47F 5/00
[52] U.S. Cl. ...................... 211/85.29; 211/162; 248/907; 220/909
[58] Field of Search .............................. 211/71.01, 85.29, 211/85.17, 46, 162, 94.01; 248/127, 146, 907; 220/908, 909

[56] References Cited

U.S. PATENT DOCUMENTS

| | | |
|---|---|---|
| 3,622,012 | 11/1971 | Lundgren ............................ 211/162 X |
| 3,860,309 | 1/1975 | Brendgord . |
| 3,908,831 | 9/1975 | Brendgord . |
| 4,015,714 | 4/1977 | Silver et al. . |
| 4,161,252 | 7/1979 | Howells . |
| 4,310,279 | 1/1982 | Johnston . |
| 4,473,158 | 9/1984 | Barber ................................ 211/162 X |
| 4,648,514 | 3/1987 | Nile ...................................... 211/41.12 |
| 4,658,966 | 4/1987 | Broek ........................................ 211/46 |
| 4,984,704 | 1/1991 | O'Malley . |
| 5,038,937 | 8/1991 | Disesa, Jr. . |
| 5,042,674 | 8/1991 | Ramsay et al. . |
| 5,105,947 | 4/1992 | Wise . |
| 5,118,124 | 6/1992 | Storay et al. . |
| 5,139,299 | 8/1992 | Smith .................................. 220/909 X |
| 5,152,420 | 10/1992 | Bird et al. . |
| 5,247,747 | 9/1993 | Grey et al. . |
| 5,375,860 | 12/1994 | Ernsberger et al. ................ 248/907 X |
| 5,445,397 | 8/1995 | Evans . |
| 5,458,350 | 10/1995 | Johnston et al. . |
| 5,542,237 | 8/1996 | Grey et al. . |
| 5,799,909 | 9/1998 | Ziegler ............................... 248/907 X |

*Primary Examiner*—Robert W. Gibson, Jr.
*Attorney, Agent, or Firm*—James C. Nemmers

[57] ABSTRACT

A system designed the efficient separation, storage, loading, unloading and transportation of recyclable materials such as paper, glass, tin cans, plastic containers, aluminum containers, etc. The major component of the system is a container that is generally box-shaped to allow the containers to be closely stacked in rows. Each container has a slot in the top edge to provide for support of the container on a collection rail bar and support frame system which allows the containers to be efficiently grouped together and thereby provide storage for all classes of materials recycled at a single geographical location. The collection rail system of the invention can be economically adapted to many different types of stationary or motorized transport systems, enabling them to become recyclable material collections systems.

14 Claims, 4 Drawing Sheets

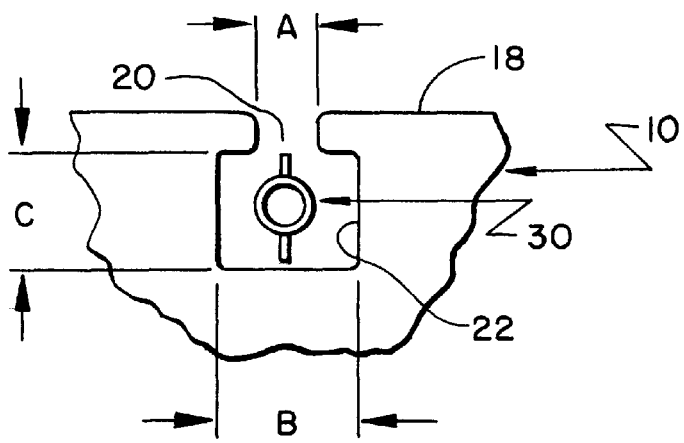
FIG. 4
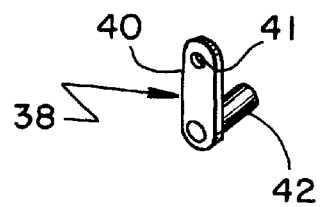
FIG. 5
FIG. 6
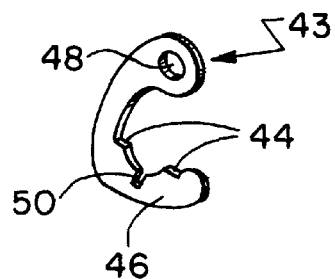
FIG. 7
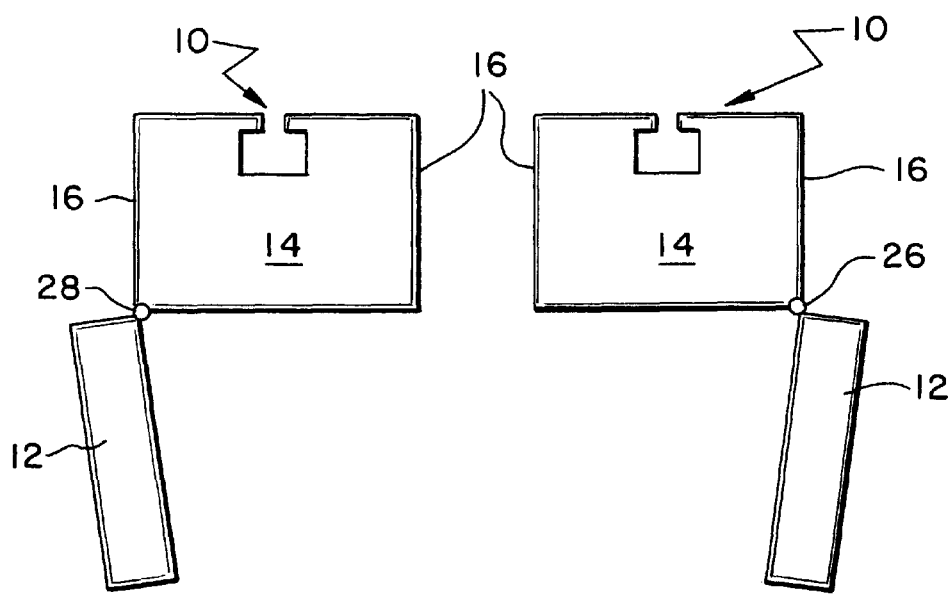

RECYCLABLE MATERIAL HANDLING SYSTEM

On Jul. 22, 1997, Applicant filed Disclosure Document No. 422110 entitled "Recycled Material Storage and Transport System" which contains a disclosure of the basic invention described and claimed hereinafter.

BACKGROUND OF THE INVENTION

This invention relates to a system for storing and handling recyclable materials and more particularly to a container system designed to separate, store and transport recyclable materials. The invention allows materials to be reduced in volume, separated at their source, stored and transported in a very efficient manner.

The increase in solid waste production by individuals and industry throughout the world has created numerous problems regarding the collection, storage and disposal of these waste materials. Solid waste landfills are at or near capacity and suitable sites for new landfills are controversial and thus extremely difficult to find. Other methods of waste disposal are not economically feasible or may create other environmental concerns. Since many of the solid waste items made primarily of paper, glass, plastic and metal materials are recyclable, the demands placed upon disposal sites such as landfills can be greatly reduced if the materials are recycled. In the past, efforts have been made to separate and store, then transport these materials to collection sites for reprocessing and reuse in new products. Governmental units such as State, County and Municipal governments have the primary responsibility for solid waste disposal, and therefore they are faced with the increasing problem of how to handle these recyclable materials efficiently and economically in order to reduce the amount of waste that must be placed in disposal sites. Moreover, the costs of providing these necessary services are increasing therefore making the recycling services available to only a fraction of the population when they should be available to all. As governmental units are being forced to provide these services to all, the costs must ultimately be borne by the users.

Various systems and containers for recyclable materials are known in the art for storing the different classes of materials in separate containers. However, there is no suitable container system known in the art that provides efficient and economical volume reduction, separation, storage and transport of recyclable materials. Current systems for storing and handling recyclable materials are labor intensive, inefficient and require expensive equipment to separate, store and transport these materials. There is therefore an immediate need for improved and more efficient systems and equipment for handling, storing and transporting recyclable materials at a reasonable cost.

SUMMARY OF THE INVENTION

The invention provides a system designed specifically for the volume reduction and the efficient separation, storage, loading, unloading and transportation of all recyclable materials such as paper, glass, tin cans, plastic containers, aluminum containers, etc. This system is designed for use anywhere materials are to be recycled.

The major component of the system is a container designed to provide a collection site for any single type of recyclable material. The container is generally box-shaped which allows the containers to be closely stacked in rows, and each container has a slot in the top edge that facilitates the efficient filling, loading, transporting and dumping of the contents of each individual container. This slot also allows the container to work in conjunction with a collection rail bar and support frame system which allows the containers to be efficiently grouped together and thereby provide storage for all classes of materials recycled at a single geographical location. The collection rail system of the invention can be economically adapted to many different types of stationary and motorized transport systems, enabling them to become recyclable material collection systems.

Another feature of the system is a volume reduction unit which allows the reduction in volume of the recyclable materials in a clean and safe manner. Forces supplied by the operator of the volume reduction unit crush the material, thereby reducing its volume.

BRIEF DESCRIPTION OF THE DRAWINGS

FIG. 4 is an end view of the collection rail and shows the collection rail interaction with the container slot;

FIG. 5 is a perspective view of the collection rail hook used to support the collection rail;

FIG. 6 is a perspective view of the support hook used to support and move the collection rail and the containers it supports;

FIG. 7 is a side view of the containers and the hinged bottom section to illustrate how the container contents can be removed from either side;

DESCRIPTION OF THE PREFERRED EMBODIMENTS OF THE INVENTION

Figure 1:
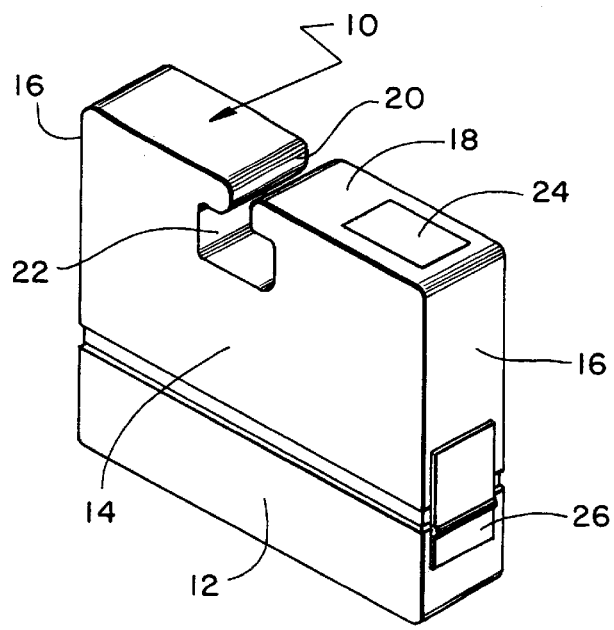
FIG. 1 is a perspective view of a container constructed according to the principles of the invention.

Referring first to FIG. 1, there is shown a refuse container 10 for containing recyclable material, such as paper, glass, metal, plastic, etc. Typically, the user sorts the recyclable material into one of these classes and places the material of only one of the classes into a selected one of the containers 10 for collection by the collecting authority. The container 10 has a bottom section 12 joined to spaced-apart substantially parallel flat side walls 14 and end walls 16 The container 10 also have a top wall 18 that is formed with a rail passage slot 20 that extends into a rail holding slot 22 formed in the side walls 14. Top wall 18 also has an opening 24 through which the user can place the refuse material into the container. The bottom section 12 is pivotally attached to the end walls 16 by hinged latches 26 and 28 so that the bottom section 12 can be swung downwardly from either end wall 16 to discharge the refuse from the container 10. This dual hinge arrangement is illustrated in FIG. 7. The hinged latches 26 and 28 preferably are mounted to the end walls 16 in such a way that no part of the latches 26 or 28 protrude externally of the container 10, i.e., through the plane surfaces created by the side walls 14 and end walls 16. The hinged latches 26 and 28 thus are recessed into the container 10 so as to allow multiple containers 10 to be stacked in rows and placed very close together, thereby taking up the least amount of space. The bottom section 12, being mounted by the hinged latches 26 and 28 at each of the end walls 14, allows the container 10 to be opened from either narrow side so that the contents of the container 10 can be deposited or dumped in the most convenient manner. The gravitational force on the contents of the container 10 allows the contents to be dumped for storage or transport when the container 10 is held in the manner described hereinafter and suspended above another larger receptacle containing material of the same class. Container 10 can be constructed of any suitable material that has the necessary strength and durability for applications of this type.

Figure 3:
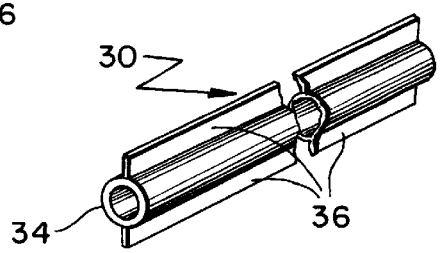
FIG. 3 is a perspective view of a first embodiment of the collection rail.
Figure 3A:
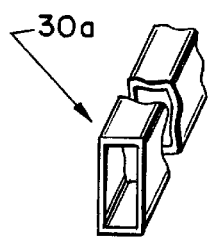
FIG. 3A is a perspective view of a second embodiment of the collection rail.
Figure 2:
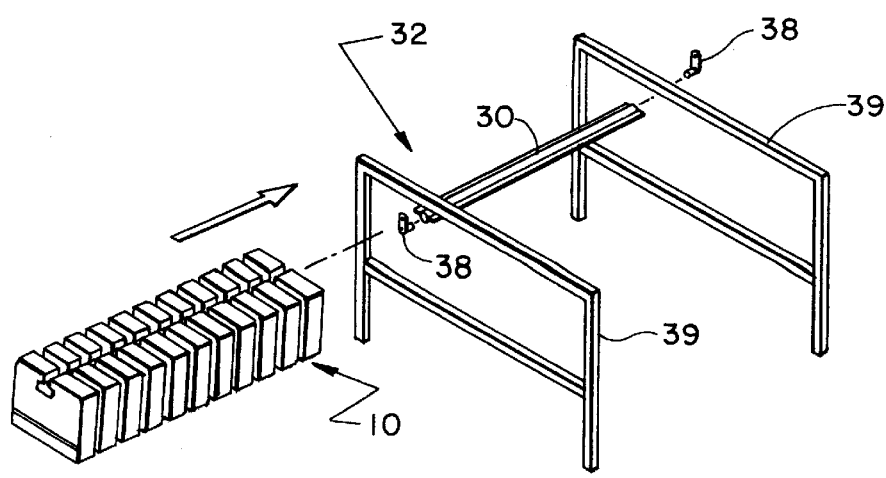
FIG. 2 is a perspective view of the transport and storage rack which supports a number of containers on a collection rail.

Referring now to FIGS. 2–6, the system of handling, storing and transporting multiple containers 10 is illustrated. The rail passage slot 20 in the top wall 18 and the rail holding slot 22 provide for suspending the container 10 on a collection rail 30 that is removably attached in a generally horizontal position on a suitable rack indicated generally by the reference numeral 32. The collection rail 30 of the first embodiment shown in FIG. 3 has a tubular center section 34 with diametrically opposed outwardly extending flanges or tabs 36 that form a longer side of the rail. Alternatively, the collection rail 30a can be a simple tube that is rectangular in cross section as illustrated in FIG. 3A. and thus has a longer side and a shorter side. With either construction of the collection rail 30 or 30a, a container 10 can be suspended on the rail by first turning the rail 30 with its longer side vertical so that the rail 30 can pass through the slot 20 into the wider slot 22 of the container 10. When so positioned in the slot 22, the rail 30 is turned 90° so that the longer side of the rail 30 is horizontal. In FIG. 2, this is illustrated using the first embodiment of the rail 30 (FIG. 3) in which the tabs 36 extend horizontally. In this position, the container 10 is held in suspension on the rail 30 as long as the tabs 36 that form the longer side of the rail 30 remain in the horizontal position. The relative dimensions of the carrier rail 30 and the slots 20 and 22 are shown in FIG. 4 in which the width "A" of the rail passage slot 20 is less than the longer side of the rail 30 measured from the outer edges of the tabs 36, but the width "A" is greater than the diameter of the central tubular section 34 of the rail 30 that defines the shorter side of the rail 30. The width "B" and height "C" of the slot 22 are slightly greater than the longer side of the rail 30 (measured from the outer edges of tabs 36) so as to allow the rail 30 to be turned inside the slot 22. With the embodiment of FIG. 3A, the longer and shorter sides of the rail 30a are obvious, with FIG. 3A showing the rail 30a positioned with the longer side vertical.

The carrier rail 30 is designed to hold one or many of the containers 10 depending on the length of rail 30 which, of course, must be constructed of suitable material having a sufficient strength to hold the desired number of containers 10 which the containers are filled with material.

Referring to FIG. 2, there is represented a typical storage or transport system utilizing the principles of the invention and showing a group of containers 10 and the carrier rail 30 supported on the support rack 32 on two end hooks 38. The support rack 32 includes two-spaced apart support frames 39 which are constructed and supported in a vertical position in any suitable manner. An enlarged view of the end hook 38 is shown in FIG. 5, and the hook 38 has a vertical support arm 40 and a horizontal pivot pin 42 affixed to the arm 40. The carrier rail 30 is suspended at its opposite ends by inserting the pivot pin 40 of the end hook 38 into the hollow circular opening at each end of the tubular center section 34. The end hooks 38 are then attached to support rack 16 with any suitable fastener (not shown) using the opening 41 in the support arm 40. The containers 10 are, of course, placed on the carrier rail 30 from one end after which the carrier rail 30 is turned 90° to lock it in place in the slot 22. The carrier rail 30 with the containers 30 suspended on it is then lifted and positioned in place between the frame members 39 of the support rack 32. The end hooks 38 are inserted into the ends of the carrier rail 30, and the end hooks 38 are then attached to the frame members 39. End hooks 38 can also be used to assist in lifting one or more of the containers 10 after they are placed on the carrier rail 30.

FIG. 6 shows an alternate design of a hook that can be used to suspend and carry the rail 30. Hook 43 is a J-shaped hook with notches 44 in the lower leg 46 that correspond to the tabs 36 of the carrier rail 30. The upper end of the rail hook 43 is provided with an opening 48 for attachment to the support frames 39 of rack 36. Opening 48 can also be used by the means that lifts the carrier rail 30 and containers 10 suspended on it. The hook 43 can be easily released from the carrier rail 30 by releasing the force on it and turning it. The hook 43 can also be used for supporting the carrier rail 30 when the tabs are vertically oriented. When so used, a vertical notch 50 in the lower leg 46 provides for seating of the tabs 36 when they are in the vertical orientation.

With either of the hook designs of FIG. 5 or FIG. 6, if the carrier rail 30 embodiment of FIG. 3A is used, the pin 42 of hook 38 or the shape of the lower leg 46 of hook 43 would be modified to adapt to the rectangular shape of the carrier rail of FIG. 3A.

Referring to FIG. 7, there is represented two options for opening a container 10 from either of the narrow sides 16. Either hinged latch 26 or 28 allows the entire bottom section 12 of the container 10 to swing open for the removal of contents of the container for deposit into a larger container, for example, positioned below the container 10.

Depending on the length of carrier rail 30 and the distance between the support frames 39 of rack 32, a number of containers 10 can be placed over either end of the rail 30 and slid or pushed toward the center for storage or for transport all at one time if the carrier rail tabs 36 are in the horizontal position.

Figure 8:
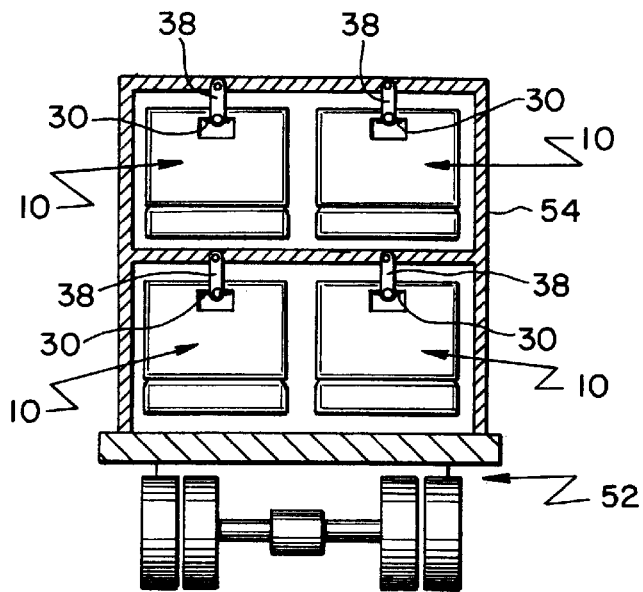
FIG. 8 is an end view of the rear of a vehicle or storage location showing how multiple storage racks are utilized to support a plurality of containers using the collection rail system.
Figure 9:
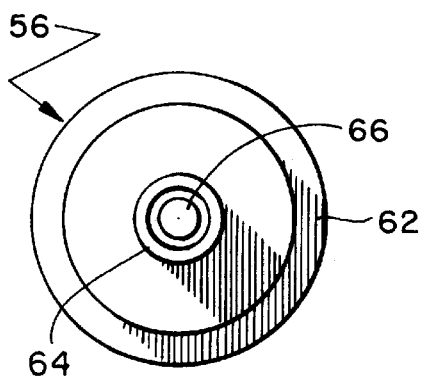
FIG. 9 is a top view of a volume reduction unit that can be used in connection with the system of the invention.
Figure 10:
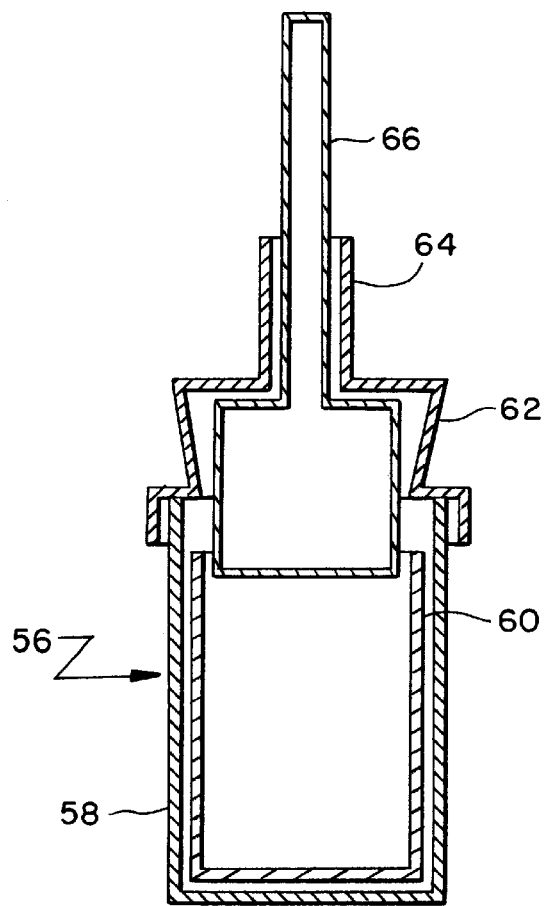
FIG. 10 is a longitudinal sectional view of the volume reduction unit of FIG. 9 taken on the line 10—10 of FIG. 9.

The support rack 32 can be mounted on any surface in order to store or transport the containers 10. Referring to FIG. 8, there is illustrated a rear view of a vehicle 52 having an attached support frame 54 that supports four rows of containers 10 on carrier rails 30 and end hooks 38. The number and size of the support frames 54 attached to the vehicle 52 may be limited by federal and state vehicle size and weight requirements.

FIG. 8 shows a volume reduction unit 56 which can be used to compact materials placed in the unit 56. The unit 56 has an outer cylindrical housing 58 and a steel insert 60. A cover 62 provides a guide 64 for an anvil 66 that is moveable up and down in the insert 60. The anvil 66 can be repeatedly lifted and dropped or forced downwardly onto material place in the insert 60 thereby reducing the volume of the material.

Figure 11:
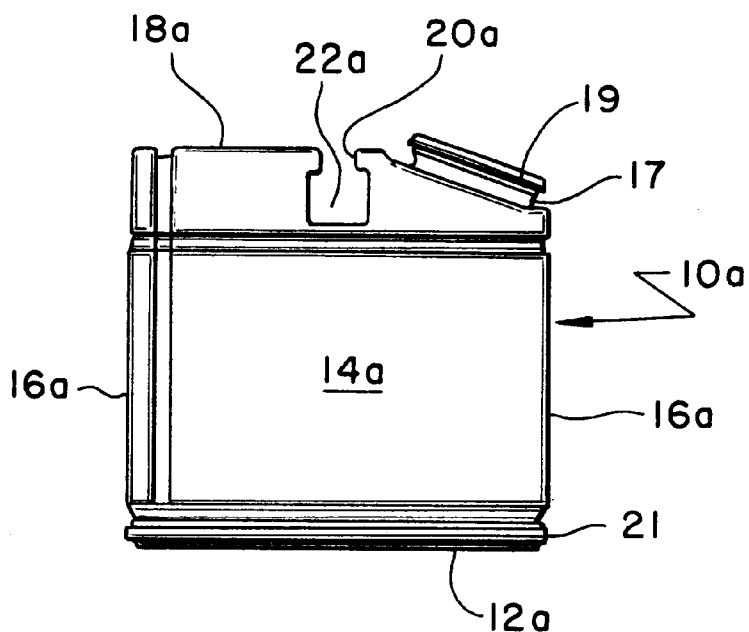
FIG. 11 is a side elevational view of another embodiment of the container.
Figure 12:
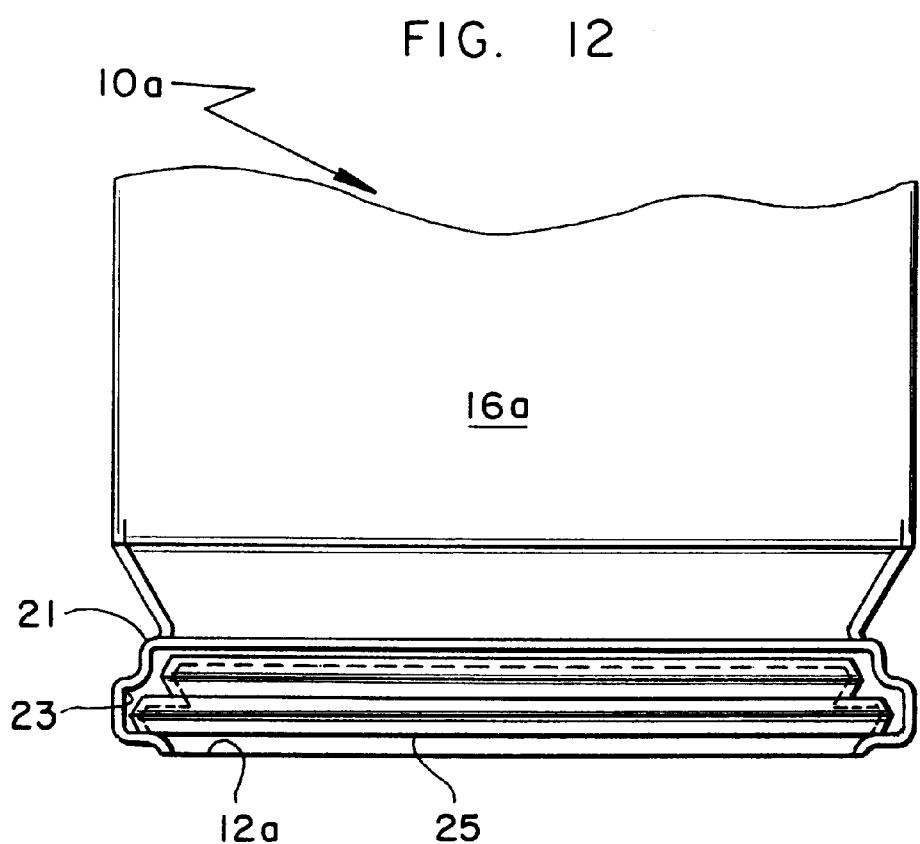
FIG. 12 is an end elevational view of the container of FIG. 11.

In FIGS. 11 and 12 there is illustrated a second embodiment of a container 10a. In this embodiment, parts corresponding to the parts of the container 10 of the first embodiment are given the same reference numbers but followed with the letter "a". Thus the container 10a has side walls 14a and end walls 16a joined by a top wall 18a. Similar to the container 10, the container 10a has a rail passage slot 20a and a rail holding slot 22a. However, instead of opening 24 in top wall 18, container 10a has a neck 17 extending upwardly from the top wall 18a that provides an opening (not shown) covered by a cap 19. In place of the hinged bottom section 12 of the container 10, the container 10a has an open bottom 12a with the lower portion 21 of one of the end walls 16a open at 23 to receive a slidable drawer 25 that is movable inwardly and outwardly to selectively open and close the open bottom of the container 10a. The structure of this second embodiment eliminates the necessity to provide clearance beneath the container to allow the pivoted bottom section 12 of container 10 to swing open so as to discharge the contents.

The design of the rail system and container of the invention thus provides different options for storing, transporting and depositing recyclable materials. The system of the invention handles the material in an efficient manner and the components of the system are economical to use and maintain. Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is as follows:

1. A system for the separation, storage, loading, unloading and transportation of recyclable materials, said system comprising: a plurality of generally box-shaped containers for storing and transporting recyclable materials, each of said containers having a top wall, a bottom wall and first and second side walls joined to the top wall and bottom wall, said top wall having an opening therein for the loading of material into the container, a rail passage slot extending through the top wall of each container from the first side wall to the second side wall, a rail holding slot beneath the rail passage slot and extending between and through the first and second side walls, the rail passage slot extending downwardly into the rail holding slot, a collection rail adapted to engage and hold a plurality of containers, the collection rail having a longer side and a shorter side, the rail passage slot having a width that is less than the longer side of the rail but greater than the shorter side of the rail thereby to allow the rail to pass through the rail passage slot when the rail is oriented with the longer side extending in a generally vertical direction, the rail holding slot having a width and height greater than the longer side of the rail to allow the rail to turn freely inside the rail holding slot, discharge means combined with the bottom wall of each container to provide for selected dumping of the material in the container, and support means for supporting the collection rail so as to support one or more containers when the containers are engaged with the collection rail.

2. The system of claim 1 for the separation, storage, loading, unloading and transportation of recyclable materials in which the collection rail has a center section that is generally cylindrical with diametrically opposed outwardly extending members.

3. The system of claim 2 for the separation, storage, loading, unloading and transportation of recyclable materials in which the members are flat, straight flanges that extend outwardly from the center section.

4. The system of claim 1 for the separation, storage, loading, unloading and transportation of recyclable materials in which the collection rail has a rectangular shaped cross section.

5. The system of claim 2 for the separation, storage, loading, unloading and transportation of recyclable materials in which the support means includes a support rack and a hook adapted to be attached to the support rack, the hook having a pivot pin removably engageable with the center section of the collection rail.

6. The system of claim 2 for the separation, storage, loading, unloading and transportation of recyclable materials in which the support means includes a support rack and a hook adapted to be attached to the support rack, the hook having a downwardly extending leg with grooves adapted to receive and hold the flanges of the collection rail when said flanges are in either a vertical or horizontal orientation.

7. The system of claim 1 for the separation, storage, loading, unloading and transportation of recyclable materials in which the discharge means includes a pivot combined with each end wall and the bottom wall of the container to provide for pivotal movement of the bottom wall downwardly about a selected one of the pivots for dumping the material in the container, and a latch is combined with each pivot to hold the bottom wall normally in a closed position.

8. The system of claim 1 for the separation, storage, loading, unloading and transportation of recyclable materials in which the discharge means includes a bottom wall having a slideable drawer moveable from a first position closing the bottom of the container and a second position in which the bottom of the container is open to provide for dumping of the material in the container.

9. The system of claim 5 for the separation, storage, loading, unloading and transportation of recyclable materials in which the discharge means includes a pivot combined with each end wall and the bottom wall of the container to provide for pivotal movement of the bottom wall downwardly about a selected one of the pivots for dumping the material in the container, and a latch is combined with each pivot to hold the bottom wall normally in a closed position.

10. The system of claim 6 for the separation, storage, loading, unloading and transportation of recyclable materials in which the discharge means includes a pivot combined with each end wall and the bottom wall of the container to provide for pivotal movement of the bottom wall downwardly about a selected one of the pivots for dumping the material in the container, and a latch is combined with each pivot to hold the bottom wall normally in a closed position.

11. The system of claim 5 for the separation, storage, loading, unloading and transportation of recyclable materials in which the discharge means includes a bottom wall having a slideable drawer moveable from a first position closing the bottom of the container and a second position in which the bottom of the container is open to provide for dumping of the material in the container.

12. The system of claim 6 for the separation, storage, loading, unloading and transportation of recyclable materials in which the discharge means includes a bottom wall having a slideable drawer moveable from a first position closing the bottom of the container and a second position in which the bottom of the container is open to provide for dumping of the material in the container.

13. The system of claim 4 for the separation, storage, loading, unloading and transportation of recyclable materials in which the discharge means includes a pivot combined with each end wall and the bottom wall of the container to provide for pivotal movement of the bottom wall downwardly about a selected one of the pivots for dumping the material in the container, and a latch is combined with each pivot to hold the bottom wall normally in a closed position.

14. The system of claim 4 for the separation, storage, loading, unloading and transportation of recyclable materials in which the discharge means includes a bottom wall having a slideable drawer moveable from a first position closing the bottom of the container and a second position in which the bottom of the container is open to provide for dumping of the material in the container.

* * * * *